(12) United States Patent
Frey et al.

(10) Patent No.: US 6,232,674 B1
(45) Date of Patent: May 15, 2001

(54) CONTROL DEVICE FOR A VEHICLE ELECTRIC SYSTEM

(75) Inventors: Wunibald Frey, Schwieberdingen; Gerhard Koelle, Wiernsheim; Albert Geiger, Eberdingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/284,306

(22) PCT Filed: Oct. 11, 1997

(86) PCT No.: PCT/DE97/02332

§ 371 Date: Apr. 28, 1999

§ 102(e) Date: Apr. 28, 1999

(87) PCT Pub. No.: WO98/19890

PCT Pub. Date: May 14, 1998

(30) Foreign Application Priority Data

Nov. 7, 1996 (DE) .............................. 196 45 944

(51) Int. Cl.[7] ...................................... B60L 3/00
(52) U.S. Cl. .............. 307/10.1; 307/64; 307/66; 700/79; 701/114
(58) Field of Search ................ 307/10.1, 64, 66; 700/79; 701/114; 320/187

(56) References Cited

U.S. PATENT DOCUMENTS

| 5,187,382 | * | 2/1993 | Kondo ................................... 307/64 |
| 5,569,997 | * | 10/1996 | Berger .................................... 306/66 |
| 5,682,314 | * | 10/1997 | Nishino et al. ...................... 710/114 |
| 5,736,793 | * | 4/1998 | Jahrsetz et al. ..................... 307/10.1 |

FOREIGN PATENT DOCUMENTS 41 38 943 C1   5/1993 (DE) .

* cited by examiner

Primary Examiner—Albert W. Paladini
(74) Attorney, Agent, or Firm—Michael J. Striker

(57) ABSTRACT

A control device for an on-board electrical system with at least two batteries which can be charged by a generator and serve to supply various consumers is described. This control device is located between the two batteries and includes a supply network element, a bus-capable microcomputer, a direct voltage converter, and a short circuit proof end stage. The control device is supplied with information via various terminals, and via other terminals the control device can output control signals. As a function of predeterminable data, the on-board electrical system control device closes the connection between the two batteries and after being switched off enters a "sleep mode".

5 Claims, 2 Drawing Sheets

CONTROL DEVICE FOR A VEHICLE ELECTRIC SYSTEM

BACKGROUND OF THE INVENTION

The invention relates to on a control device for an on-board electrical system, in particular to a vehicle electric system having at least two batteries that can be charged by a generator.

PRIOR ART

The voltage supply in a motor vehicle that has many electrical consumers can sometimes no longer be achieved with a single battery, and thus increasingly vehicle electric systems are being equipped with two separate batteries, which can be connected to one another via suitable electronic circuits. One such vehicle electric system is known for instance from German Patent 41 38 943.

In this known vehicle electric system, a first battery is intended predominantly to supply the starter, while the second battery serves to supply the other consumers. The two batteries can be connected to one another or disconnected from one another with the aid of a so-called charge-disconnect module, and the connection can be opened or closed by the charge/disconnect module as a function of predeterminable conditions. The voltage supply for the charge/disconnect module is provided from both batteries.

SUMMARY OF THE INVENTION

It is an object of the present invention to provide a control device for an electrical system of a vehicle, which has the advantage that it is in continuous communication with the batteries used for power supply purposes; the power consumption in the deactivated state is minimal, and after the ignition switch is actuated, very fast, simple activation of the control device can take place.

The object of the present invention is attained by a control device for a vehicle on-board electrical system which has a power supply device including a generator and at least two batteries charged by the generator and supplying power to consumers. The control device comprises a microcomputer, two end stages respectively including two field effect transistors which are connected to each other and are connectable to their respective batteries and which are switchable so as to establish connection between the batteries only under predetermined conditions. The control device also has two diodes each coupled at one side thereof to a respective end stage and at another side to a further field effect transistor which is connected to the microcomputer. The further field effect transistor switches the control device into operation by a control signal supplied thereto. A connection between the microcomputer and at least one of the batteries is then established. The control signal supplied to the further field effect transistor depends on information obtained at a start.

In its turned off state, the further field effect transistor remains blocked and the control device is operated in a so-called "sleep mode" in which current consumption is very light.

It is als advantageous that with the aid of the control device of the invention, a highly variable design of the on-board electrical system structure is possible. If a bus-capable microcomputer is used in the control device, an information exchange with the on-board electrical system can be achieved. This information exchange can advantageously also extend to an information exchange with the actual control device of the internal combustion engine, so that in the voltage regulation, engine operating conditions can also be taken into account, such as rpm, idling rpm, or load. At the same time, the control device that regulates the engine can take into account variables of a typical generator or the vehicle on-board electrical system; the temperature of the batteries can also be taken into account; this temperature can advantageously be ascertained from easily measured variables by means of an observer function. It is thus possible for the vehicle on-board electrical system control device to vary both charging voltages.

The two batteries are advantageously connected in parallel by means of semiconductor switches, and power MOSFETS are especially suitable.

The battery intended for the starter is advantageously supplied as needed from the on-board electrical system via a direct voltage converter. If the voltage level of one of the two batteries drops below a predeterminable value, then emergency operation can be carried out, in which the starter battery can be charged from the other battery via a direct voltage converter sufficient to assure restarting. By using an error memory located in the on-board electrical system, emergency operation information can be stored in memory and displayed the next time the engine is started or the next time the vehicle is in the shop, and if necessary the operating state of the control device is reset to the sleep mode.

DETAILED DESCRIPTION OF THE PREFERRED EMBODIMENTS

Figure 1:
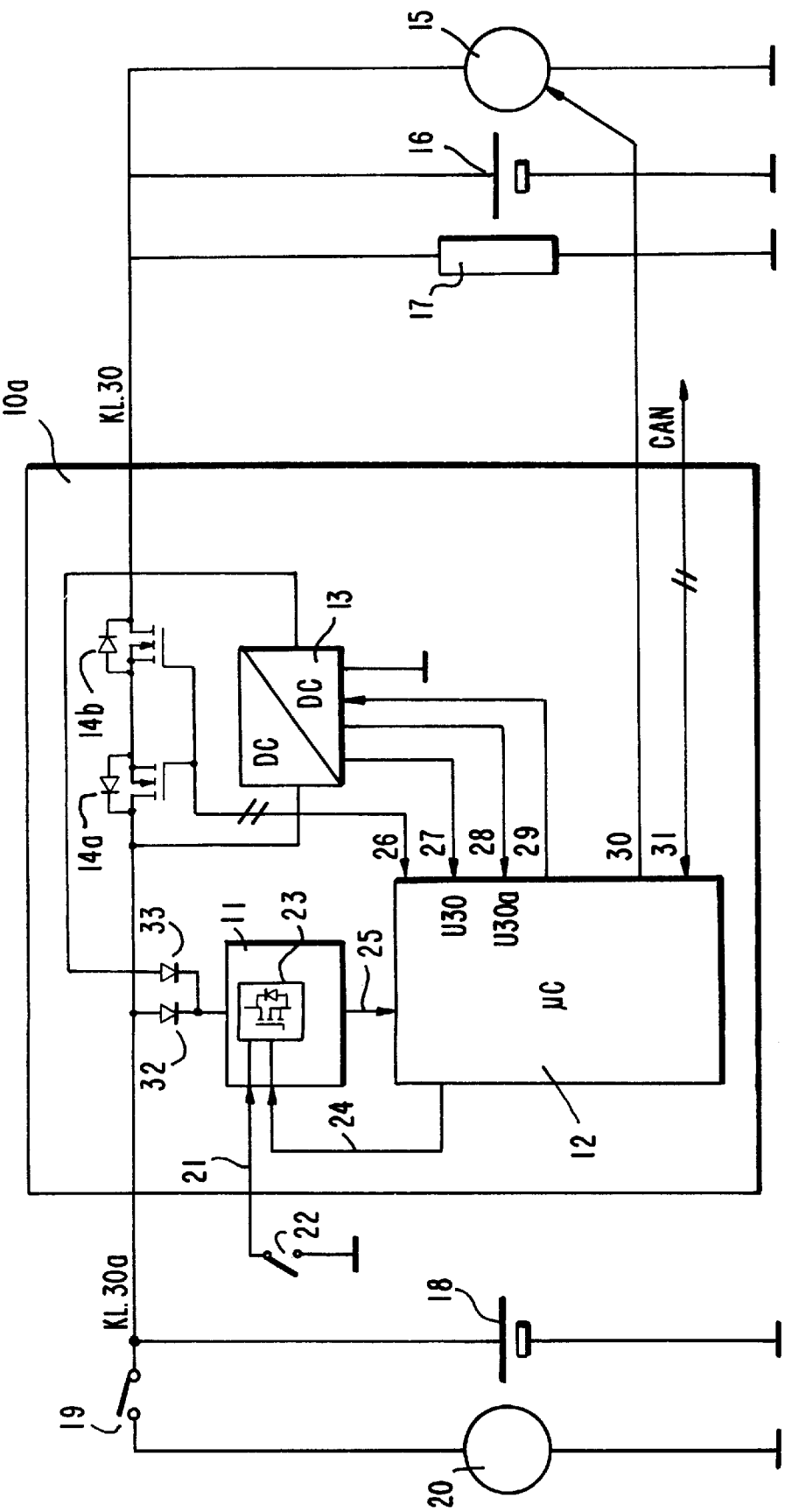
FIG. 1 is a block diagram of the control device of the first embodiment of the invention.
Figure 2:
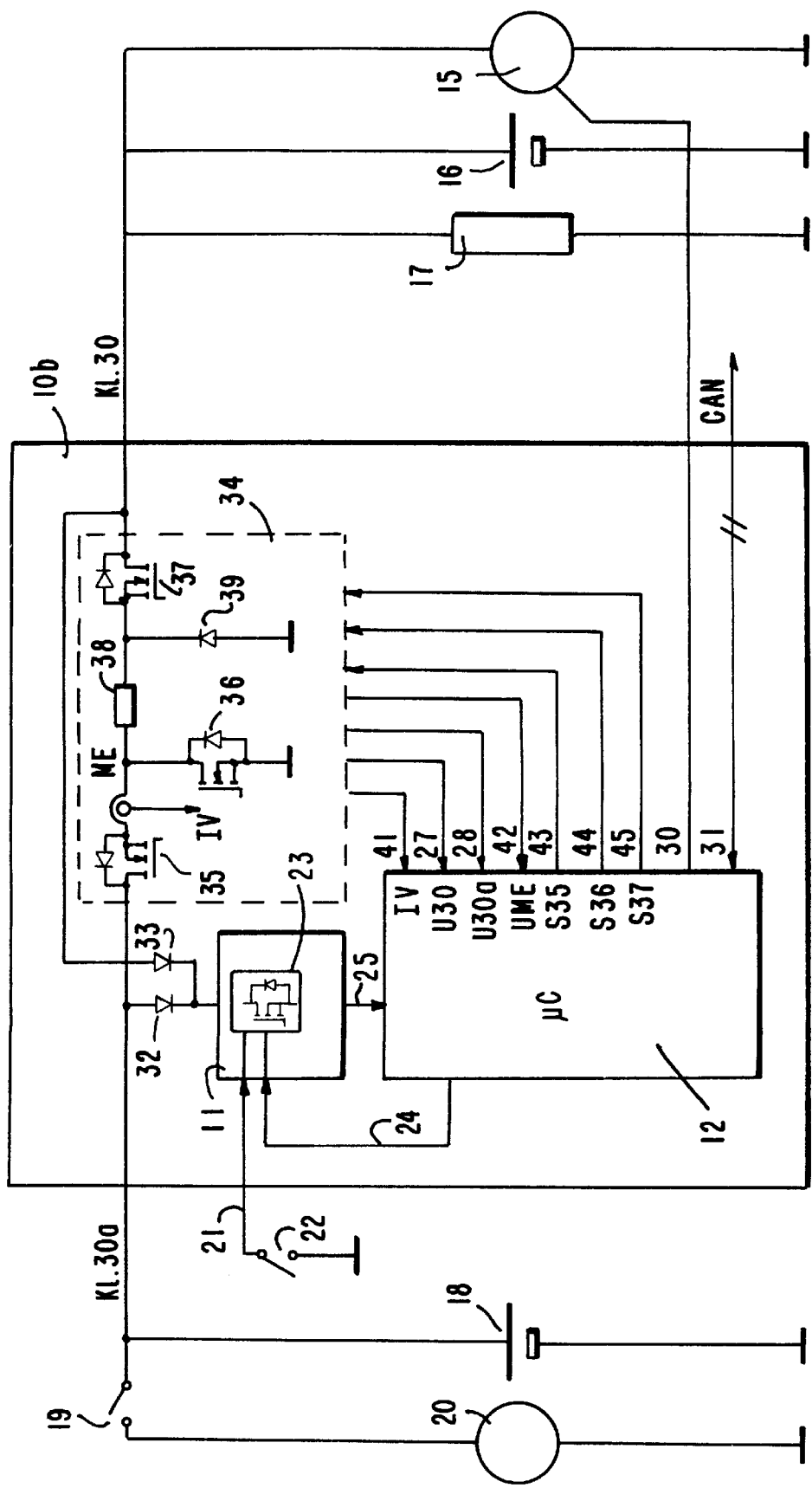
FIG. 2 is a block diagram of the control device of the second embodiment.

Two exemplary embodiments of the invention are shown in FIGS. 1 and 2 and described in further detail below.

Description

In FIG. 1, the design of an on-board control device for a dual-battery on-board electric system is shown, which assures the energy supply to the exemplary embodiment even if the battery is empty and also assures optimal, gentle charging of both batteries. In detail, the on-board control device 10 comprises a supply network element 11, a control and regulating unit 12, embodied for instance as a bus-capable microcomputer, a direct voltage converter 13, and a short-circuit-proof end stages 14a, 14b. The on-board control device 10a is thus connected with its inputs on the power side to the terminals. Typically the generator 15, the battery 16 acting as the supply battery for the on-board electrical system (on-board electrical system battery) and the load 17 are connected to the terminal Kl. 30. The load 17 stands for the many on-board electrical system consumers present, and the consumers can each be turned on via switches, not shown.

The battery 18 is connected to the terminal Kl. 30a; it is designed as a starter battery and serves to supply the starter 20 when the switch 19 is closed.

Both the control device 10a and the control and regulating unit 12 have a number of inputs and outputs, which establish the connection with the individual components of the on-board control device or the remainder of the on-board electrical system. One of these inputs is designated 21; it serves the purpose of initialization and leads from the supply network element 11 to the switch 22. If this switch 22 is closed, then the field effect transistor 23 of the supply network element 11 is made conducting. Via a connection 24 between the supply network element 11 and the control and regulating unit 12, the field effect transistor 23 can also be initialized by the control and regulating unit 12. The supply of voltage to the control and regulating unit 12 from the supply network element 11 is made via the connection 25.

The control and regulating unit 12, or the associated microcomputer, has further terminals 26, 27, 28, 29, 30 and 31, by way of which information about the switching status of the end stages 14a, 14b and about the voltages U30 and U30a prevailing at the Kl. 30 and Kl. 30a can be supplied. Via the terminal 29, control signals can be set down to the direct voltage converter 13. Via the terminal 30, it is possible to act on the generator 50, and the terminal 31 is a bidirectional terminal for a bus, such as a CAN bus or body bus. Via these terminals, data or control signals can be exchanged that make it possible to regulate the generator taking into account engine operating conditions and to regulate the engine taking into account on-board electrical system conditions.

The function of the exemplary embodiment of FIG. 1 can be described as follows:

1. Functions During Normal Operation

Via the two diodes 32, 33, the anode of each of which is connected to the respective terminal Kl. 30 and Kl. 30a, the power unit 11 of the control device 10a is connected to both batteries via the field effect transistor 23, without further intermediate switches. In this state, the on-board control device 10a is in a "sleep mode". In this operating state, the current consumption amounts to only a few $\mu$ amperes and is thus below the range of the self-discharging of the battery. The long-term current consumption is thus negligibly low.

Via a mechanical contact, for instance in the ignition lock to ground or after terminal Kl. 30a, symbolized by the switch 22, the field effect transistor 23 of the supply network element 11 is made conducting, and the total supply of the on-board control device 10a is activated. Once the microcomputer of the control and regulating unit 12 is booted up, the microcomputer first checks the voltage situation on the on-board electrical system side, that is, at the terminal Kl. 30. To that end, the control and regulating unit is supplied with the voltage U30 via the input. If these voltages are above a programmable value, for instance of 11.8 V, then the two battery circuits remain separate. The on-board control device 10a then waits for the information that says starting has occurred. If this information has not arrived within a predeterminable period, such as 30 seconds, then the total current supply is deactivated. The field effect transistor 23 in the supply network element 11 is switched over to the blocked state by triggering from the microcomputer, and the on-board control device 10a returns to the "sleep mode".

Reactivation of the on-board control device after that is possible only by reactuating the mechanical switch 22, for instance by removing the ignition key and reinserting it.

Once the engine has successfully been started, the variables required for optimal voltage regulation are ascertained by utilizing the information furnished by individual sensors or present anyway in the engine control device. In an on-board electrical system that has a body bus system, this body bus is also connected to the microcomputer of the on-board control device. From the information that can be delivered to the body bus recharging the ambient temperature, coolant temperature, or engine temperature, as well as the passenger compartment temperature, the temperatures of the two batteries can be ascertained by skillful linkages, without having to measure these temperatures directly. Since the battery temperature is an essential variable for regulating the voltage, it should be taken into account in setting the set-point voltage. The temperature-dependent charge voltage for the on-board electrical system battery 16 is then specified by specifying a set-point value that is supplied to the generator regulator.

Electronic switches, DC/DC converters, and so forth, which for instance protect the lamps, should be used in on-board electrical systems in which different voltages are made available for individual consumers, so that the consumers that are sensitive to relatively high voltages will be protected. These electronic switches or DC/DC converters are advantageously used at various points in the on-board electrical system, so that the various consumers downstream of them are protected.

The battery 18 intended for supplying the starter can be supplied as needed via a DC/DC converter from the on-board electrical system side in such a way that both a higher charge voltage level and a lower charge voltage level, or the same charge voltage level in comparison with the on-board electrical system voltage can be realized in a manner adapted to temperature. The use of a suitable voltage converter also makes it possible to charge the starter battery even when the on-board electrical system battery is relatively severely discharged. A battery whose specifications are especially adapted to requirements, such as furnishing a brief high current, is used as the starter battery.

2. Function During Emergency Operation

With the exemplary embodiment of FIG. 1, emergency operation is still possible in the event that the on-board electrical system voltage has dropped too low. If after the initialization phase and interrogation of the on-board electrical system voltage, it is found that this voltage is below a minimum predetermined voltage level, emergency operation is tripped. To that end, when the predetermined voltage level fails to be attained, both batteries 16 and 18 are connected parallel by the on-board control device, and thus the on-board electrical system is also supplied from the starter battery 16. At the same time, emergency operation information is transmitted, so that the consumers can be turned off as needed via the electronic switches upstream of them; it will be noted that only those consumers that are not relevant to function or safety will be turned off. In addition, an error memory located on the on-board electrical system side can be used, or a display can be tripped.

In emergency operation as well, the voltage supply for the on-board control device 10a is interrupted whenever no start has taken place within the predeterminable time. The batteries 16, 18 are then disconnected again from one another, and the control device 10 changes to the sleep mode, until a new request for turn-on is tripped by the closure of the mechanical switch 22.

If the engine is started in the emergency operating mode, the generator 15 takes up its work in the usual way, and the on-board electrical system's voltage rises after a relatively short time, because of the current furnished by the generator. Once the on-board electrical system voltage reaches the defined threshold, the parallel connection of the two batteries is disconnected again; the trigger pulse required for this is tripped by the control and regulating unit 12. Once the connection between the two batteries 16 and 18 is opened, the batteries are charged by the method described above in section 1; the battery 18 for supplying the starter is given charging priority, so that even after only a brief trip, enough energy will again be available for a subsequent start.

In FIG. 2, a second exemplary embodiment of the invention is shown, in which the short-circuit-proof end stage and the voltage converter of the exemplary embodiment of FIG. 1 are replaced by a power part with a converter 34. This power part with a converter 34 comprises the field effect transistors 35, 36 and 37, the inductive resistor 38 acting as a choke, and the free-wheeling diode 39. Various connections exist between the power part with the converter 34 and the microcomputer of the control and regulating unit 12; in part, they correspond to the connections in the exemplary embodiment of FIG. 1. Identical components have the same reference numerals as in FIG. 1. Additional connections or terminals 41, 42, 43, 44, 45 are present, by way of which information about the supply current IV and the voltage UME, is delivered to the control and regulating unit 12. The supply current IV is measured between the transistor 35 and the inductive resistor 38, and the voltage UME is measured at the point ME. Trigger signals S35, S36, S37 to the transistors 35, 36, 37 are output via the connections or terminals 43, 44 and 45.

The on-board control device 10b shown in FIG. 2 functions in principle in the same way during normal operation as the on-board control device 10a of FIG. 1. The mode of operation of the on-board control device of FIG. 2 during emergency operation can be described as follows:

If the evaluation of the on-board electrical system voltage after the initialization phases shows that this voltage is below a predeterminable minimal value, the on-board control device 10b connects the two batteries 16 and 18 in parallel, and the on-board electrical system is jointly supplied via the starter battery 18. In that case, the transistor 35 and the transistor 37 are conducting, while the transistor 36 is blocked. If after the engine starts and thus current is output by the generator 15, the on-board electrical system voltage exceeds the predetermined voltage level, then a switchover is made to normal operation, with a voltage increase which has the effect that the voltage U30a is higher than U30. The transistor 37 is then made conducting, and the transistors 35 and 36 then work in the push-pull mode. Upon a voltage decrease in which the voltage U30a is less than the voltage U30, the transistor 37 is operated in clocked fashion. The transistor 36 blocks, and the transistor 37 is turned on.

Since the exemplary embodiment of FIG. 2 is equipped with a series-connected choke that delays the current rise, no additional overload protection is needed in the power part with the converter. The current rise is delayed by the choke 30 enough that the microcomputer of the control and regulating unit 12 can react within its cycle time and can thus assure overload protection. The current measurement may be done by direct current detection via a shunt or via an evaluation of the voltage course of UDS or via turning the applicable field effect transistor 35 or 37 on for a limited time and observing the voltage at the terminal Kl. 30 or Kl. 30a. The transistor 37 can serve at the same time as a switch for the direct voltage converter, so that a step-up/step-down converter is obtained as the DC/DC converter and used to connect the two batteries 16, 18 in parallel.

The two exemplary embodiments of the invention have been selected for a vehicle electric system. In principle, an on-board control device of the invention can also be used in other dual-battery supply systems. An expansion to more than two batteries is also possible in principle.

What is claimed is:

1. A control device for a vehicle on-board electrical system having a power supply device including a generator (15) and at least two batteries (16, 18) chargeable by said generator and supplying power to at least a first consumer and a second consumer, the control device comprising a microcomputer (12), two end stages respectively including two field effect transistors (14a, 14b or 35, 37) which are connected to each other and each being connectable to a respective one of said two batteries, said two field effect transistors being switchable so as to establish connection between said batteries only under predetermined conditions; at least one further field effect transistor (23) coupled to said microcomputer; and two diodes (32, 33) each being coupled at one side thereof to a respective end stage and at another side thereof to said further field effect transistor, wherein said further field effect transistor switches the control device into operation by a control signal supplied thereto and a connection between said microcomputer and at least one of said batteries is established and wherein said control signal is dependent upon information obtained at a start of a vehicle.

2. The control device of claim 1, wherein said microcomputer is supplied with information via inputs, and as a function of said information said computer ascertains trigger signals, which are passed via connections to individual components of the control device and of the vehicle on-board electrical system.

3. The control device of claim 1, and further comprising a direct voltage converter (13) coupled to and being triggerable by said microcomputer and is connectable in series between said two batteries (16) and (18).

4. The control device of claim 1, and further comprising a power part with a converter which is in connection between said two batteries (16) and (18), and which outputs data to said microcomputer (12) and receives trigger signals from said microcomputer.

5. The control device of claim 4, wherein said power part with the converter includes a series circuit of said first field effect transistor (35), a choke (38), and said second field effect transistor (37), and a transistor (36) and a diode (39) of which at least one is located between a respective terminal of said choke (38) and ground.

* * * * *